United States Patent [19]

Andrews

[11] Patent Number: 5,054,335
[45] Date of Patent: Oct. 8, 1991

[54] SYSTEM FOR SHIFTING FOUR-WHEEL VEHICLES

[76] Inventor: Ben A. Andrews, HCR 105, Sonoita, Ariz. 85611

[21] Appl. No.: 309,203
[22] PCT Filed: May 27, 1988
[86] PCT No.: PCT/US88/01804
 § 371 Date: Jan. 19, 1989
 § 102(e) Date: Jan. 19, 1989
[87] PCT Pub. No.: WO88/09453
 PCT Pub. Date: Jan. 12, 1988

Related U.S. Application Data

[63] Continuation-in-part of Ser. No. 25,826, May 29, 1987, abandoned, and Ser. No. 101,246, Sep. 24, 1987, abandoned.

[51] Int. Cl.[5] .................................................. F16H 37/06
[52] U.S. Cl. .................................. 74/665 GA; 180/247
[58] Field of Search .......................... 74/339, 665 GA; 180/233, 247

[56] References Cited

U.S. PATENT DOCUMENTS

| | | | |
|---|---|---|---|
| 2,220,463 | 11/1940 | Sinclair | 192/67 |
| 2,385,231 | 9/1945 | Peterson et al. | 74/477 |
| 2,397,587 | 4/1946 | Armantrout | 180/247 |
| 3,095,758 | 7/1963 | Bixby | 74/701 |
| 3,788,164 | 1/1974 | Ojima | 74/665 T |
| 4,103,753 | 8/1978 | Holdeman | 130/49 |
| 4,188,838 | 2/1980 | Nakao et al. | 74/701 |
| 4,233,857 | 11/1980 | Quick | 74/665 GA |
| 4,270,409 | 6/1981 | Glaze et al. | 74/665 GA |
| 4,292,860 | 10/1981 | Kako et al. | 74/477 |
| 4,305,309 | 12/1981 | Ookubo et al. | 74/477 |
| 4,314,627 | 2/1982 | Nozawa | 192/53 F |
| 4,324,152 | 4/1982 | Oshima et al. | 74/606 R |
| 4,344,335 | 8/1982 | Kawai | 74/674 |
| 4,441,379 | 4/1984 | Malkowski et al. | 74/477 |
| 4,462,271 | 7/1984 | Stieg | 74/711 |
| 4,559,846 | 12/1985 | Cochran et al. | 74/665 GA |
| 4,605,084 | 8/1986 | Haynes et al. | 180/70.1 |
| 4,745,825 | 5/1988 | Yamamoto | 74/665 GA |
| 4,781,266 | 11/1988 | Hoffa et al. | 180/247 X |
| 4,782,721 | 11/1988 | Dick | 180/247 X |
| 4,838,121 | 6/1989 | Takeshita et al. | 74/785 |

FOREIGN PATENT DOCUMENTS

| | | |
|---|---|---|
| 504111 | 7/1954 | Canada . |
| 3510493 | 3/1985 | Fed. Rep. of Germany . |
| 958913 | 3/1950 | France . |
| 1223083 | 6/1960 | France . |
| 1265584 | 12/1961 | France . |

OTHER PUBLICATIONS

American Motor Corp. publication, Transfer Case 207, pp. 8 and 9 (Mar. 1986).
Subaru Service Manual, Haynes publication 681, 1980–1988, pages attached.
"A Transfer Case That's Out of This World", Four Wheeler Magazine, Feb. 1983, pp. 47–49.
Toyota Repair Manual, vol. 2, Jan. 1989, pp. TF-41, 42 and 58.

*Primary Examiner*—Dirk Wright

[57] ABSTRACT

A transfer unit for a four-wheel drive vehicle includes a low-gear/high-gear shifting section and a two-wheel drive/four-wheel drive section. Both sections use gears with beveled portions and a synchronizer blocker ring to synchronize the rotation of gears before they are coupled to each other. This synchronization allows the vehicle to be shifted from low-gear to high-gear or from two-wheel drive to four-wheel drive while the vehicle is in motion without damaging the components of the transfer unit.

4 Claims, 7 Drawing Sheets

SYSTEM FOR SHIFTING FOUR-WHEEL VEHICLES

This application is a continuation-in-part of U.S. application Ser. No. 07/025,826 filed May 29, 1987 now abandoned, and of U.S. application Ser. No. 07/101,246 filed Sept. 24, 1987 now abandoned.

BACKGROUND OF THE INVENTION

This invention relates to transfer units for four-wheel vehicles and particularly to transfer units which enable four-wheel drive vehicles to be shifted between two-wheel drive and four-wheel drive, and low-gear and high-gear.

Four-wheel drive vehicles are highly desirable for off-road travel over rough terrain. However two-wheel drive vehicles are more desirable on normal hard, improved road surfaces. Therefore to satisfy the needs of the operator who drives on a variety of surfaces, vehicles have been produced that are capable of shifting between two-wheel drive and four-wheel drive. Traditionally, these types of vehicles could only be shifted between two-wheel drive and four-wheel drive when the vehicle was at a halt.

Recently, vehicles capable of shifting between two-wheel drive and four-wheel drive have been produced having transfer units that synchronize their front and rear output shafts before the actual shifting takes place. An example of such a transfer unit can be found in U.S. Pat. No. 4,555,846 to Cochran et al. The synchronizing apparatus in Cochran, however, is hard to repair and requires a plurality of parts that tend to wear out over time.

The capability to shift between low-gear and high-gear is also very desirable. This is especially so for four-wheel drive vehicles, which often encounter terrain that requires the use of low-gear at one point and high-gear at another point. In prior art vehicles having the capability to shift between low-gear and high-gear, such shifting could only be accomplished when the vehicle was at a halt. Stopping the vehicle in order to perform such a shift between low-gear and high-gear has proved to be very inconvenient, especially for the off-road racing enthusiast.

SUMMARY OF THE INVENTION

An object of the present invention is to provide an easily repairable, efficient and economical apparatus for synchronizing the front and rear output shafts of a transfer unit, such that a vehicle in which such transfer unit is installed can shift between two-wheel drive and four-wheel drive while the vehicle is moving.

An additional object of the present invention is to provide an apparatus for synchronizing the rear output shaft and the high gear of a transfer unit, such that a vehicle in which such a transfer unit is installed can smoothly and efficiently shift between low-gear and high-gear while the vehicle is moving.

Generally, the present invention includes a transfer unit having an input shaft, a rear output shaft, a front output shaft, a low-gear/high gear section, and a two-wheel drive/four wheel drive section. The low-gear/-high gear section has low and high range power transfer gears which are selectively coupled to the rear output shaft. When the transfer unit is shifted between low-gear and high-gear, the rear output shaft is synchronized with the high range power transfer gear before the high range power transfer gear is actually coupled to the rear output shaft.

The two-wheel drive/four-wheel drive section of the transfer unit has a power transfer gear coupled to the front output shaft and a synchronizer ring coupled to the rear output shaft. The power transfer gear has a beveled portion. When the transfer unit is shifted between two-wheel drive and four-wheel drive, the synchronizer ring engages the beveled portion of the power transfer gear to synchronize the front and rear output shafts before the front and rear output shafts are actually coupled.

DETAILED DESCRIPTION OF THE PRESENTLY PREFERRED EMBODIMENT

Figure 1:
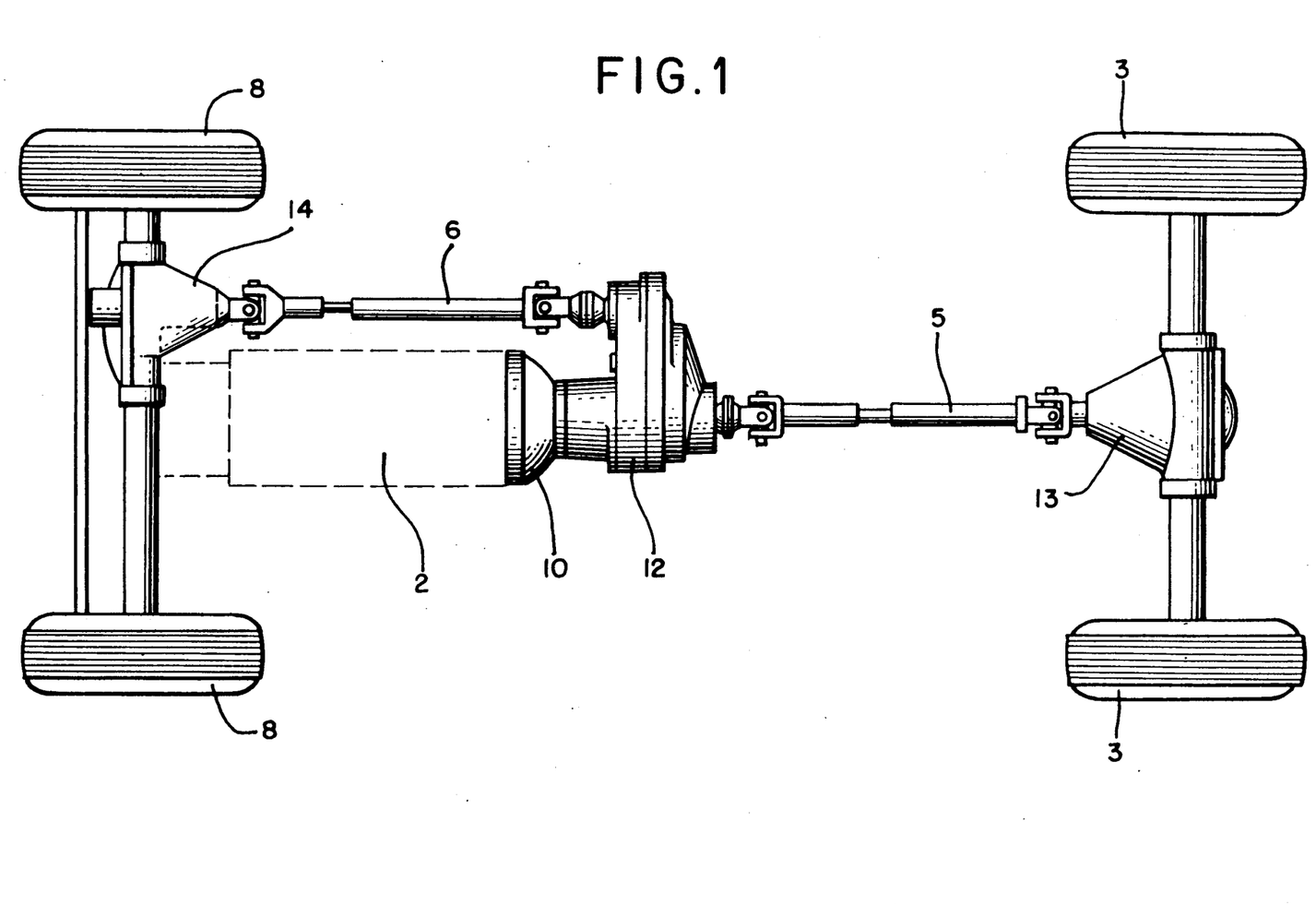
FIG. 1 is a plan view of components of a four-wheel vehicle including a transfer unit of the present invention.

Referring now to the drawings, FIG. 1 shows a transfer unit 12 of a preferred embodiment of the present invention positioned in a four-wheel vehicle behind the engine 2 and its transmission 10. An input shaft 15 (not shown in FIG. 1) transmits engine driving power from the transmission 10 to the transfer unit 12. Power is transmitted from the unit 12 to the rear wheels 3 through a differential 13 while power supplied to the front wheels 8 is supplied through a differential 14.

Figure 2:
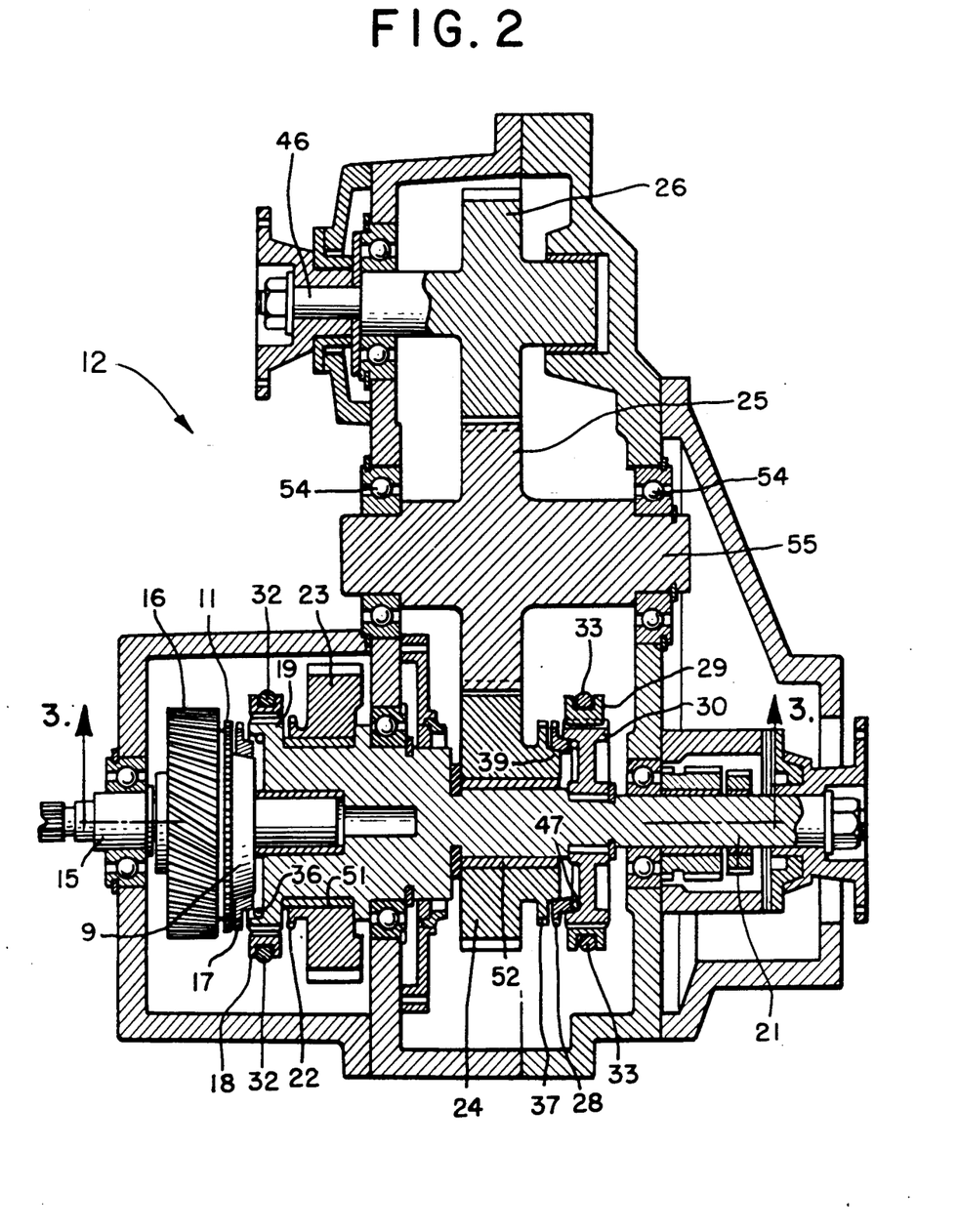
FIG. 2 is a cross sectional view of a preferred embodiment the transfer unit as shown in FIG. 1.
Figure 3:
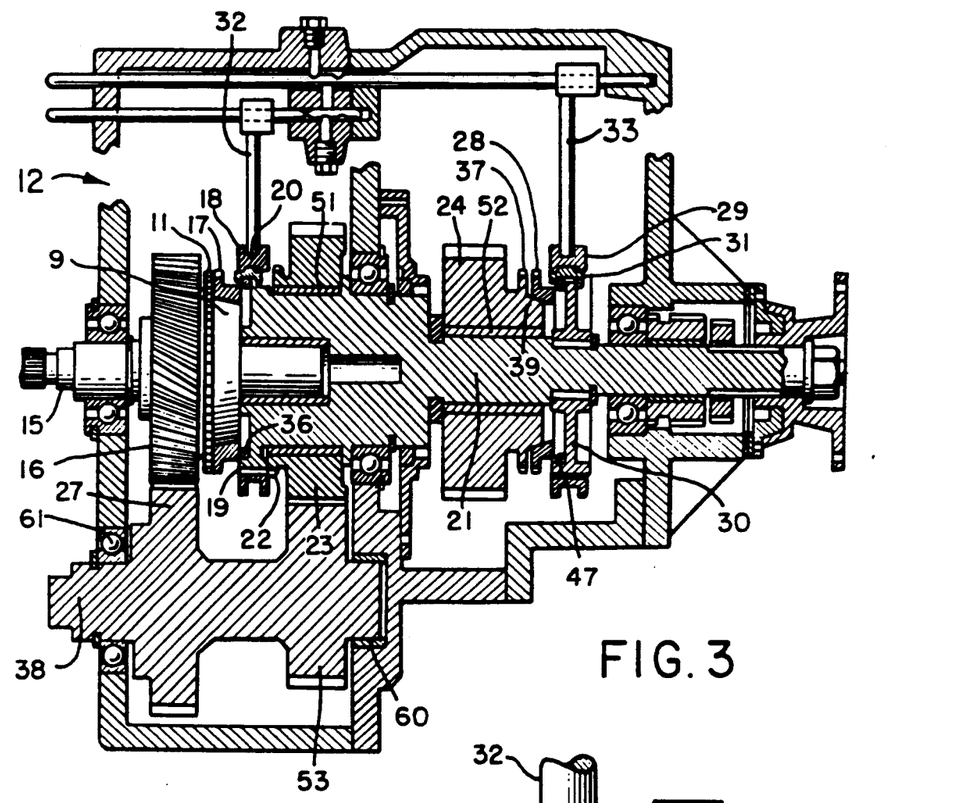
FIG. 3 is a cross sectional view of the transfer unit of FIG. 2 as taken on line 3—3.

As best shown in FIGS. 2 and 3, the transfer unit 12 receives rotary power from the transmission 10 via input shaft 15. High range power transfer gear 16 rotates with input shaft 15 and is preferably integral with the input shaft 15. High range power transfer gear 16 includes a high gear hub slider guide 11, which is preferably integral with the high range power transfer gear 16. Low range power transfer gear 23 is axially mounted on a rear output shaft 21 in a free-wheeling manner via bearings 51 and includes a low gear hub slider guide 22. The high range power transfer gear 16 engages a first low gear counter shaft gear 27 which is preferably integral with a low gear counter shaft 3S, which is mounted in the transfer unit 12 via bearings 60, 61. A second low gear counter shaft gear 53, having a diameter less than that of the first low gear counter shaft gear 27 is also preferably integral with the low gear counter shaft 38 and engages the low range power transfer gear 23. The power transfer gear, idler gear, and front output shaft drive gear form a four wheel drive - two wheel drive shifting section. In this manner the rotary motion of input shaft 15 is transferred from the high range power transfer gear 16 to the first low gear counter shaft gear 27 to the second low gear counter shaft gear 53 to the low range power transfer gear 23. The high range power transfer gear, low range power transfer gear low gear counter shaft, and first and second low gear counter gears from a high-low gear shifting section.

Figure 4A:
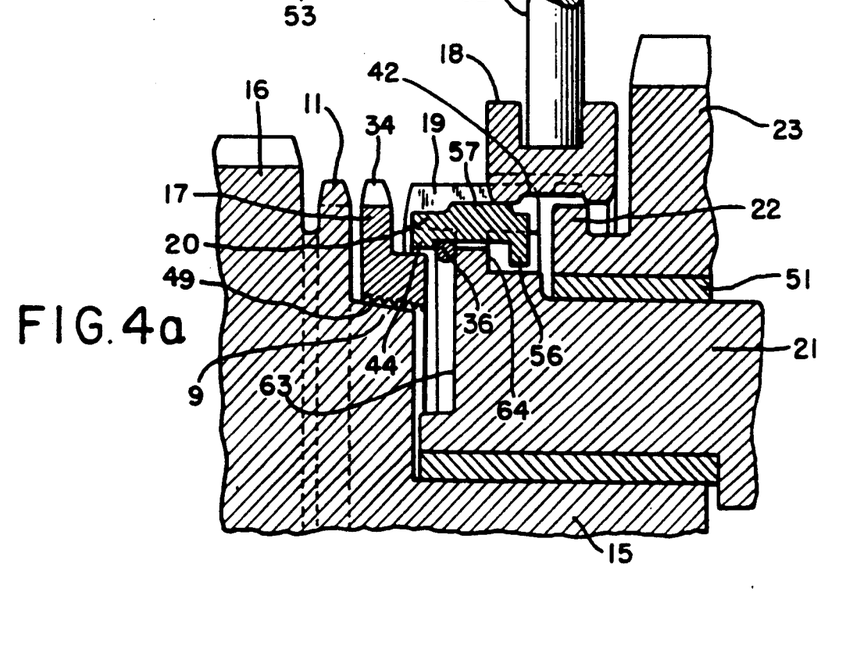
FIGS. 4a–d are cross sectional views of the low-gear/high gear section of a preferred embodiment of the transfer unit as the vehicle is shifted from low-gear to high-gear.
Figure 4B:
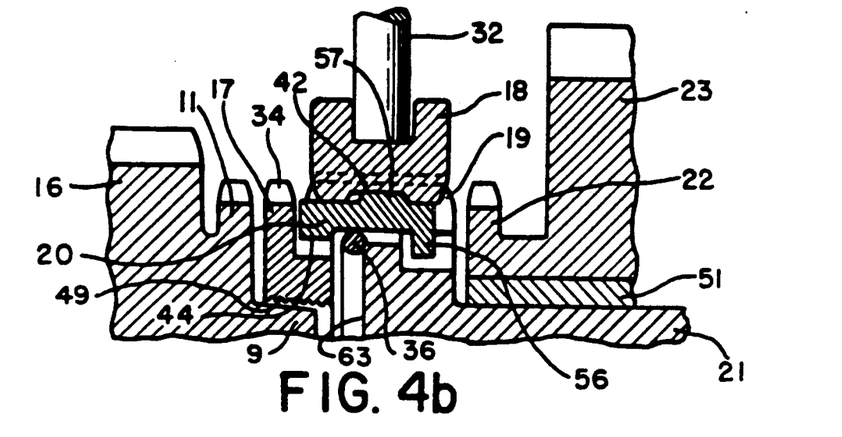

Rear output shaft 21 includes a hub guide 19, which is preferably integral with the rear output shaft 21. A shifting hub 18 is axially mounted around the hub guide 19 and is selectively positioned by shifter fork 32 so that the hub guide 19 is coupled to the high gear hub slider guide 11, as shown in FIG. 4d, or to the low gear hub slider guide 22, as shown in FIG. 4a. The shifter fork 32 also can position the shifting hub 18 such that the hub guide 19 is not coupled to any other gear, as shown in FIG. 4b. Thus, the position of the shifting hub 18 determines whether the rear output shaft 21 is coupled to the high range power transfer gear 16, the low range power transfer gear 23, or no gear at all. In this manner, the rotary motion of the input shaft 15, via either the high range power transfer gear 16 or the low gear 23, is transferred to the rear output shaft 21 and to the rear drive shaft 5, which is coupled to the rear output shaft 21.

As best shown in FIGS. 2 and 3, the power transfer gear 24 is axially mounted on the rear output shaft 21 in a free-wheeling manner via bearings 52. The power transfer gear 24 includes a transfer gear hub slider guide 37, which is preferably integral with the power transfer gear 24. The transfer gear 24 engages an idler gear 25 which is preferably integral with an idler shaft 55 mounted in the transfer unit 12 via bearings 54. Idler gear 25 engages front output shaft drive gear 26, which is preferably integral with the front output shaft 46, which is coupled to the front drive shaft 6 the power transfer gear 24, idler gear 25, and front output shaft drive gear 26, form a four wheel drive-two wheel drive shifting section.

Figure 5A:
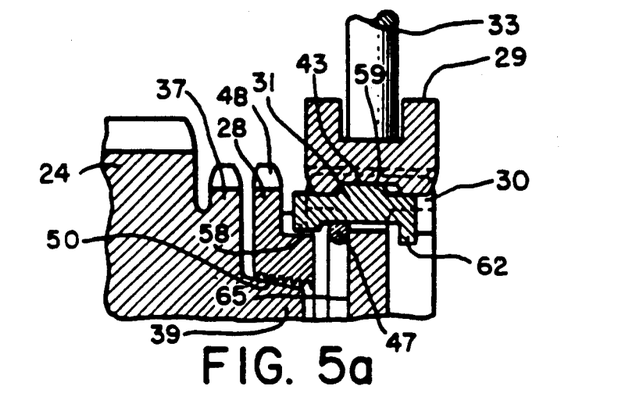
FIGS. 5a–c are cross sectional views of the two-wheel drive/four-wheel drive section of a preferred embodiment of the transfer unit as the vehicle is shifted from two-wheel drive to four-wheel drive.

Hub guide 30 is attached to the rear output shaft via a spline-type connection. Shifting hub 29 is axially mounted around the slider hub guide 30 and is selectively positioned by shifter fork 33 so that the hub guide 30 is selectively coupled to or uncoupled from the output shaft transfer gear 24 via the transfer gear hub slider guide 37. In this manner, the rotary motion of the rear output shaft 21 is selectively transferred to transfer gear 24, to idler gear 25, to the front output shaft drive gear 26, to the front output shaft 46 to the front drive shaft 6. Thus the shifting hub 29 can be positioned so the vehicle is in two-wheel drive, as shown in FIG. 5a or in four-wheel drive as shown in FIG. 5c.

Figure 6:
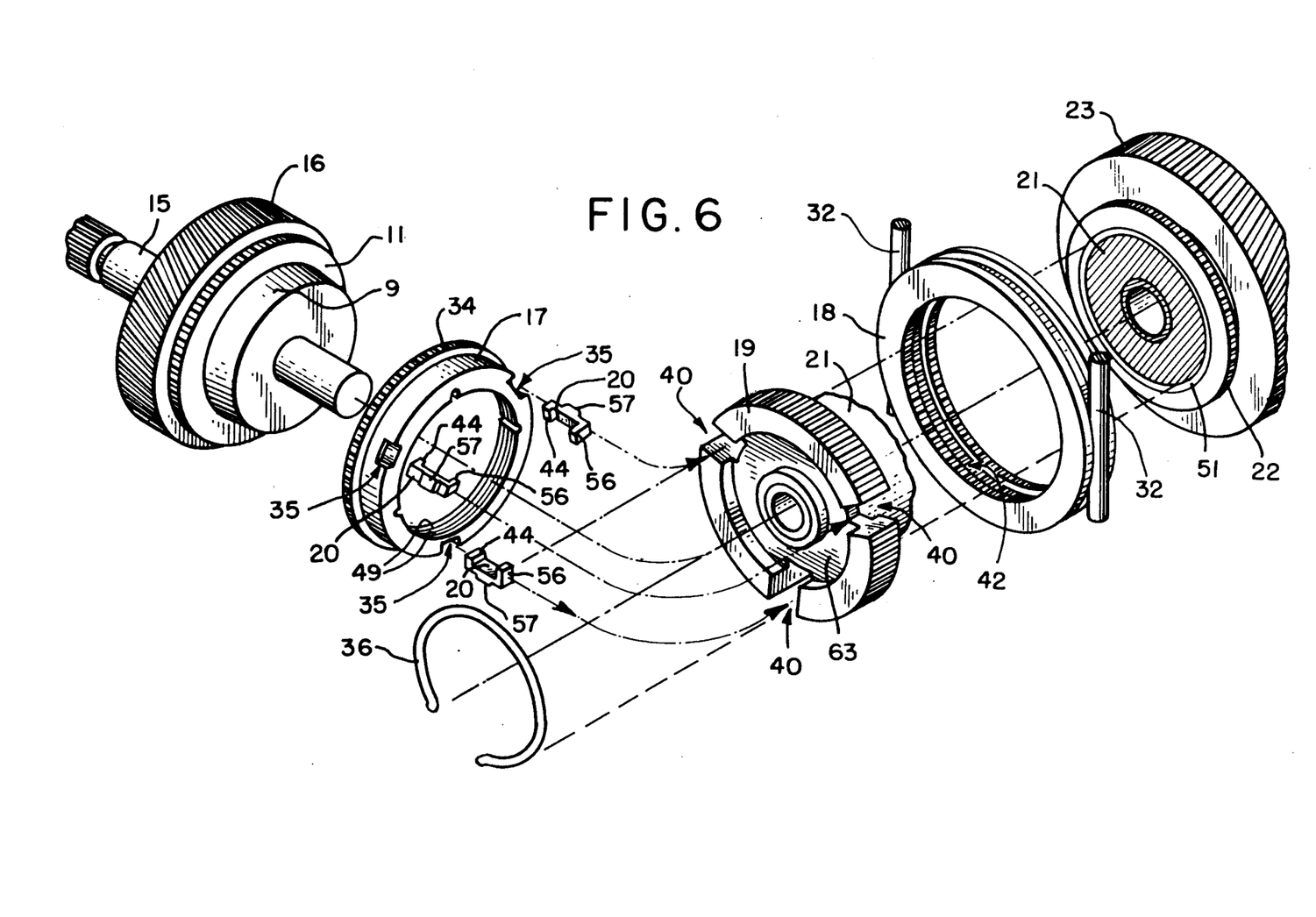
FIG. 6 is an exploded view, in perspective, of the low-gear/high gear section of a preferred embodiment the transfer unit.

As best shown in FIG. 6, the high range power transfer gear 16 includes a beveled portion 9. A synchronizer blocker ring 17 is positioned axially about the rear output shaft 21 between the high range power transfer gear 16 and the first synchronizer hub guide 19. The synchronizer blocker ring 17 includes gear teeth 34 and an inner surface beveled at the same angle as the beveled portion 9 of the high range power transfer gear 16. In addition, the blocker ring 17 includes a plurality of ridges 49 along its inner surface and a plurality of notches 35 for receiving blocker ring detent blocks 20. The beveled portion g and the synchronizer blocker ring 17 are of a type well-known to those of ordinary skill in the art. For example such beveled portions g in combination with such synchronizer blocker rings 17 are manufactured by Spicer Corporation of Toledo, Ohio as part of a gear assembly. Part No. 8072X. In one preferred embodiment, the beveled portion 9 and the inner surface of the synchronizer blocker ring 17 each has an angle of approximately six degrees. In addition, preferably, the synchronizer blocker ring 17 is made of brass and has approximately fifteen concentric ridges 49 along its inner surface.

Each blocker ring detent block 20 includes a short extension 44, a long extension 56, and a protrusion 57. The hub guide 19 is formed with a plurality of slots 40 around its periphery for receiving the blocker ring detent blocks 20. The short extensions 44 are positioned on the side of the hub guide 19 having a surface 63 that faces the high range power transfer gear 16. The long extensions 56 are positioned on the side of the hub guide 19 having a surface that faces the low range power transfer gear 23. Such detent blocks 20 are well-known to those of ordinary skill in the art.

A detent pressure spring 36 is positioned on face 63 to resiliently force the protrusions 57 of the detent blocks 20 into a groove 42 in the shifting hub 18. In this manner, when the shifting hub 18 moves parallel to the axis of the rear output shaft 21, the blocker ring detent blocks 20 will move with the hub 18 until the detent pressure spring 36 engages the short extensions 44 or the long extensions 56 are forced against the surface of the hub guide 19 that faces the low range power transfer gear 23. At that point, as the hub 18 continues to move in a direction parallel to the axis of the rear output shaft 21, the protrusions 57 will move out of the groove 42 and the blocker ring detent blocks 20 will be forced against the detent pressure spring 36.

Figure 7:
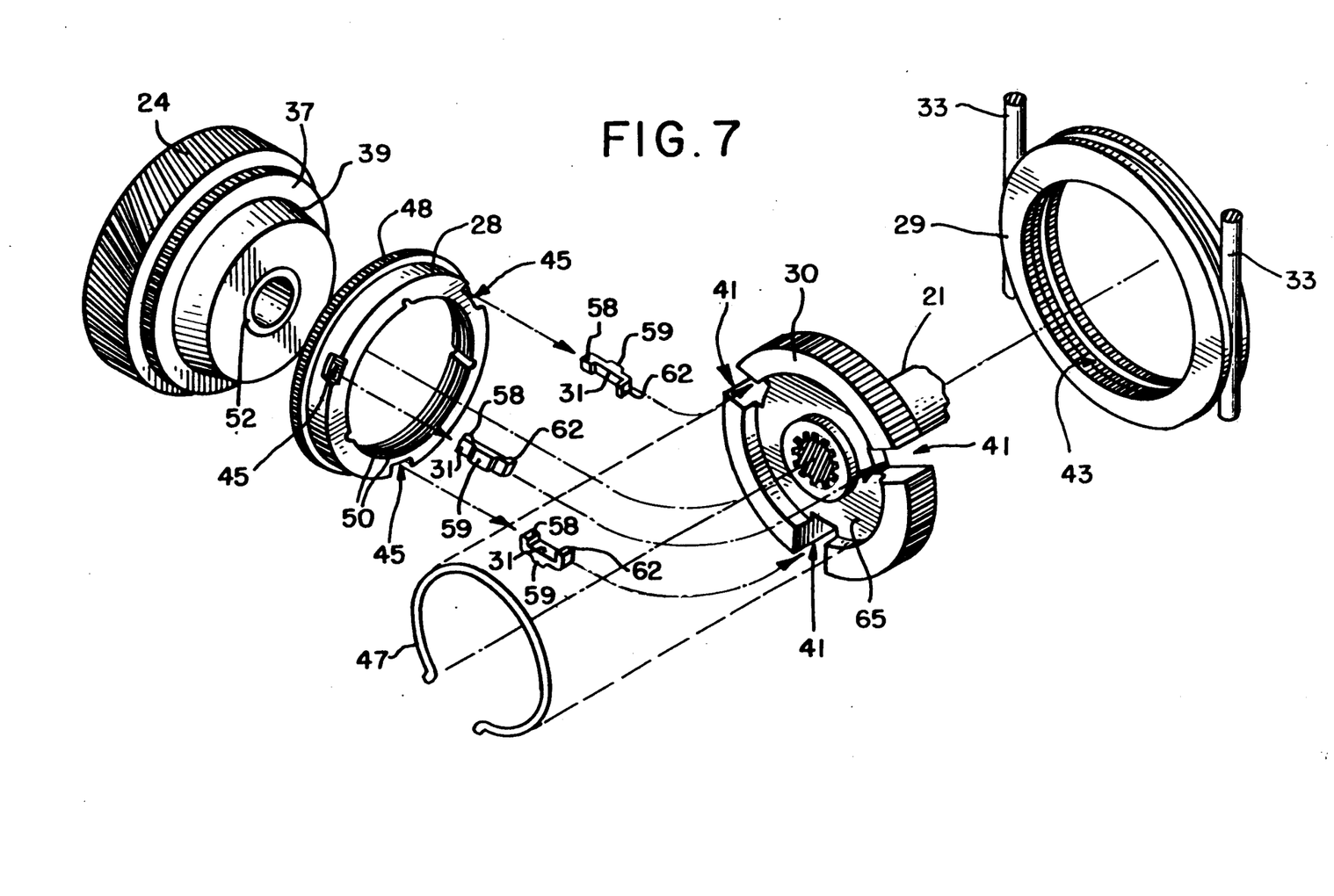
FIG. 7 is an exploded view, in perspective, of the two-wheel drive/four-wheel drive section of a preferred embodiment of the transfer unit.

As best shown in FIG. 7, the power transfer gear 24 includes a beveled portion 39, preferably integral with said power transfer gear 24. A synchronizer blocker ring 28 is positioned axially about the rear output shaft 21 between the power transfer gear 24 and the hub guide 30. The synchronizer blocker ring 28 includes gear teeth 48 and an inner surface beveled at the same angle as the beveled portion 39 of the power transfer gear 24. In addition, the blocker ring 28 includes a plurality of ridges 50 along its inner surface and a plurality of notches 45 for receiving blocker ring detent blocks 31. The beveled portion 39 and the synchronizer blocker ring 28 are of the same type as beveled portion 9 of the high range power transfer gear 16 and the synchronizer blocker ring 17, and, as explained previously, are well-known to those of ordinary skill in the art. In one preferred embodiment the beveled portion 39 and the inner surface of the synchronizer blocker ring 28 each has an angle of approximately six degrees. In addition, preferably, the synchronizer blocker ring 28 is made of brass and has approximately fifteen concentric ridges 50 along its inner surface.

The blocker ring detent blocks 31 are identical to the blocker ring detent blocks 20 and, as explained previously, are well-known to those of ordinary skill in the art. The detent blocks 31 include short extensions 58, long extensions 62, and protrusions 59. The hub guide 30 is formed with a plurality of slots 41 around its periphery for receiving the blocker ring detent blocks 31. The short extensions 58 are positioned on the side of the hub guide 30 having a surface 65 that faces the power transfer gear 24. The long extensions 62 are positioned on the side of the hub guide having a surface that faces away from the power transfer gear A detent pressure spring 47 is positioned on surface 65 to resiliently force the protrusions 59 of detent blocks 31 into a groove 43 in the shifting hub 29. In this manner, when the shifting hub 29 moves parallel to the axis of the rear output shaft 21, the blocker ring detent blocks 31 will move with the hub 29 until the detent pressure spring 47 engages the short extensions 58 or the long extensions 62 are forced against the surface of the hub guide 30 that faces away from the power transfer gear 24. At that point, as the hub 29 continues to move in a direction parallel to the axis of the rear output shaft 21, the protrusions 59 will move out of the groove 43 and the blocker ring detent blocks 31 will be forced against the detent pressure spring 47.

Turning now to the operation of the preferred embodiment, as best shown in FIG. 4a, when the transfer unit 12 is operating in the low-gear mode, the shifting hub 18 is positioned so that it engages the low gear hub slider guide 22 as well as the hub guide 19. When in this position, the shifting hub 18 transfers the rotary motion of the low range power transfer gear 23, via the low gear hub slider guide 22 to the hub guide 19, which in turn transfers the rotary motion to the rear output shaft 21.

As best shown in FIG. 4b, when the transfer unit 12 is operating in the neutral mode, the shifting hub 18 is positioned so that it only engages the hub guide 19. As best shown in FIG. 4d, when the transfer unit 12 is operating in the high-gear mode, the shifting hub 18 is positioned so that it engages the high gear hub slider guide 11 as well as the hub guide 19. When in this position, the shifting hub 18 transfers the rotary motion of the high range power transfer gear 16, via the high gear hub slider guide 11, to the hub guide 19, which in turn transfers the rotary motion to the rear output shaft 21.

Figure 4C:
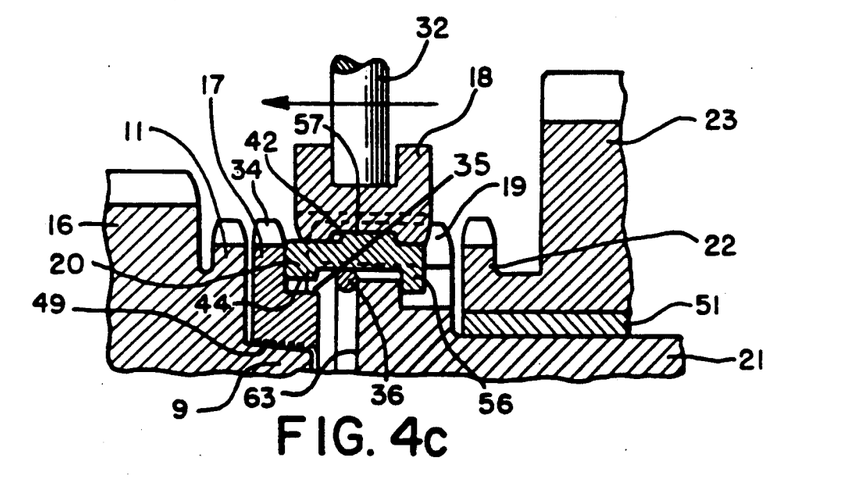
Figure 4D:
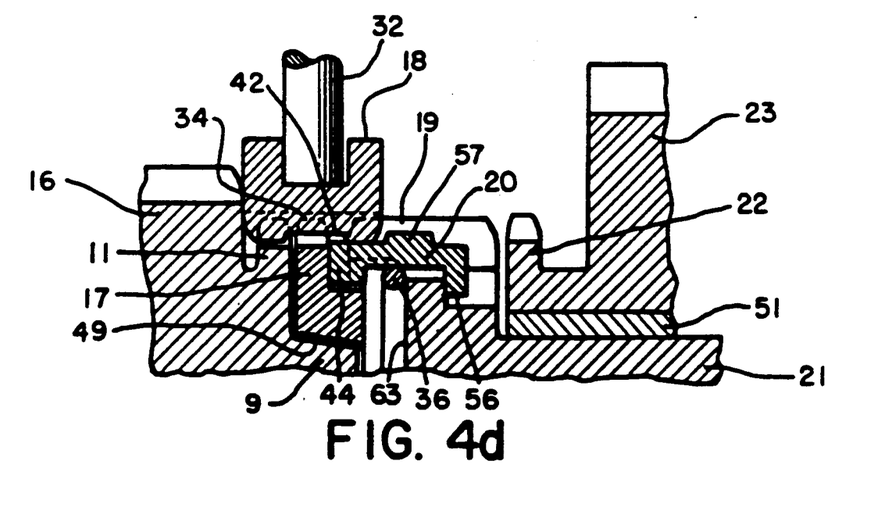

As best shown in FIG. 4c, as the shifting hub 18 is moved by shifter fork 32 from the neutral operating position toward the high range power transfer gear 16, the blocker ring detent blocks 20 force the synchronizer blocker ring 17, which rotates at the same speed as the first hub guide 19 due to the engagement of the notches 35 by the blocker ring detent blocks 20, against the beveled portion g of the high range power transfer gear 16. As the beveled portion 9 frictionally engages the ridges 49 of synchronizer blocker ring 17, the rotary motion of the beveled portion 9 is transferred to the synchronizer blocker ring 17 which in turn transfers the rotary motion to the hub guide 19, which transfers the rotary motion to the shifting hub 18 as well as to the rear output shaft 21. Thus, the high range power transfer gear 16 and the hub guide 19 are synchronized and rotate at approximately the same speed. As the hub 18 continues to move towards the high range power transfer gear 16, the protrusions 57 of the blocker ring detent blocks 20 move out of the groove 42 in the hub 18 and, as explained previously, the detent blocks 20 are disengaged from the hub 18. The hub 18 then easily engages the gear teeth 34 of the blocker ring 17 and the high gear hub slider guide 11. In this manner shifting from low-gear to high-gear can be accomplished while the vehicle is moving (i.e. "on the fly") without damaging the components of the transfer unit.

Shifting from two-wheel drive to four-wheel drive is accomplished in the same manner as shifting from low-gear to high-gear. As best shown in FIG. 5a, when the transfer unit 12 is operating in the two-wheel drive mode, the shifting hub 29 is positioned so that it only engages the hub guide 30. As best shown in FIG. 5c, when the transfer unit 12 is operating in the four-wheel drive mode, the shifting hub 29 is positioned so that it engages the transfer gear hub slider guide 37 s well as the hub guide 30. When in this position, the shifting hub 29 transfers the rotational motion of the rear output shaft 21, via hub guide 30 and the transfer gear hub guide 37, to the power transfer gear 24, which in turn transfers the rotational motion to the front output shaft via idler gear 25, and the front output shaft drive gear 26.

Figure 5B:
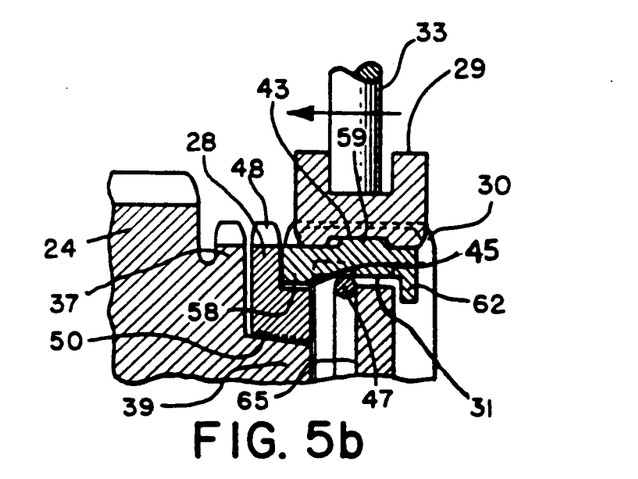
Figure 5C:
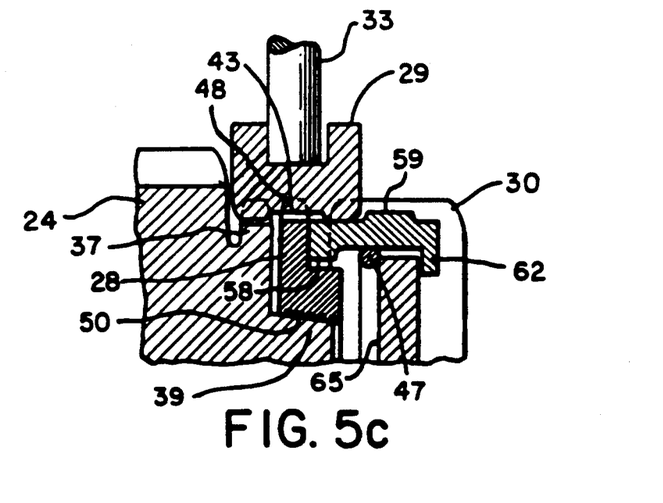

As best shown in FIG. 5b, when the vehicle is shifted from two-wheel drive to four-wheel drive, the shifting hub 29 is moved towards the power transfer gear 24 by shifter fork 33. As the hub 29 moves towards the power transfer gear 24, the blocker ring detent blocks 31 force the synchronizer blocker ring 28, which rotates at the same speed as the hub guide 30 due to the engagement of the notches 45 by the blocker ring detent blocks 31, against the beveled portion 39 of the power transfer gear 24. As the ridges 50 of blocker ring 28 frictionally engage the beveled portion 39 of the power transfer gear 24, the rotary motion of the blocker ring 28 is transferred to the power transfer gear 24. Thus, the power transfer gear 24 and the hub guide 30 are synchronized and rotate at approximately the same speed. As the hub 29 continues to move towards the power transfer gear 24, the protrusions 59 of the blocker ring detent blocks 31 move out of the groove 43 in the hub 29 and, as explained previously, the detent blocks 31 are disengaged from the hub 29. The hub 29 then easily engages the gear teeth of the blocker ring 28 and the transfer gear hub slider guide 37. In this manner shifting from two-wheel drive to four-wheel drive can be accomplished "on the fly" without damaging the components of the transfer unit.

Of course, it should be understood that various changes and modifications to the preferred embodiment described herein will be apparent to those skilled in the art. For example, while preferred structures including integral structures have been described, it is understood that alternate structures which include multiple components may similarly be employed. As a further example; details of construction, proportions, or materials may be altered. Such changes and modifications can be made without departing from the scope of the present invention and without diminishing its attendant advantages. It is, therefore, intended that such changes and modifications be covered by the following claims.

I claim:

1. A four wheel drive transfer unit for a vehicle comprising:
    an input shaft;
    a rear output shaft;
    a front output shaft;
    a high-low gear shifting section;
    a four wheel drive-two wheel drive shifting section;
    said high-low gear shifting section comprising a high range power transfer gear mounted on the input shaft, a low gear counter shaft, first and second low gear counter shaft gears, a low range power transfer gear rotatably mounted on the rear output shaft, and a synchronizer clutch between the rear output shaft and the high range power transfer gear;
    said four wheel drive-two wheel drive shifting section comprising a power transfer gear rotatably mounted on the rear output shaft, an idler gear, a front output shaft drive gear fixed to the front output shaft, and a synchronizer clutch between the power transfer gear and the rear output shaft.

2. A four wheel drive transfer unit according to claim 1 wherein the high-low gear shifting section further comprises the high range power transfer gear meshing with the first low gear counter shaft gear and the low range power transfer gear meshing with the second low gear counter shaft gear.

3. A four wheel drive transfer unit according to claim 1 wherein the four wheel drive-two wheel drive section further comprises the power-transfer gear meshing with the idler gear which in turn meshes with the front output shaft drive gear.

4. A four wheel drive transfer unit according to claim 1 wherein the synchronizer clutches further comprise blocker rings, hub guides, shifting hubs, the hub slider guides arranged such that, upon shifting from low to high gear or from two wheel drive to four wheel drive, each shifting hub slides on each hub guide and engages each blocker ring, each blocker ring frictionally engaging each hub slider guide, and upon the synchronizing of each hub slider guide and blocker ring, the shifting hub positively engages the hub slider guides, thus completing the shift.

* * * * *

UNITED STATES PATENT AND TRADEMARK OFFICE
CERTIFICATE OF CORRECTION

PATENT NO. : 5,054,335

DATED : October 8, 1991

INVENTOR(S) : Ben A. Andrews

It is certified that error appears in the above-identified patent and that said Letters Patent is hereby corrected as shown below:

Column 1, Line 31 Change "Patent No. 4,555,846" to -- Patent No. 4,559,846 --.

Column 2, Line 60 Change "3s" to -- 38 --.

Column 2, Line 66 Delete "the power transfer gear, idler gear, and front output shaft drive gear form a four wheel drive-two wheel drive shifting section".

Column 3, Line 7 Change "from" to -- form --.

Column 3, Line 65 Change "g" to -- 9 --.

Column 3, Line 67 Change "g" to -- 9 --.

Column 4, Line 68 After "gear" Insert -- 24 --.

Column 5, Line 43 Change "g" to -- 9 --.

Column 6, Line 59 Between "gear" and "mounted" Insert -- fixedly --.

Column 8, Line 5 Between "hub" and "guides" Insert -- slider --.

UNITED STATES PATENT AND TRADEMARK OFFICE
CERTIFICATE OF CORRECTION

PATENT NO. : 5,054,335

DATED : October 8, 1991

INVENTOR(S) : Ben A. Andrews

It is certified that error appears in the above-identified patent and that said Letters Patent is hereby corrected as shown below:

Column 8, Line 10, change "synchronizing" to -synchronization-.

Signed and Sealed this

Third Day of March, 1992

Attest:

*Attesting Officer*

HARRY F. MANBECK, JR.

*Commissioner of Patents and Trademarks*